June 27, 1967

D. H. McKEOUGH 3,328,039

LEAK-PROOF SEAL

Filed Feb. 8, 1965

INVENTOR.
D. HARVEY McKEOUGH

BY

OSTROLENK, FABER, GERB & SOFFEN
ATTORNEYS

June 27, 1967  D. H. McKEOUGH  3,328,039
LEAK-PROOF SEAL
Filed Feb. 8, 1965
2 Sheets-Sheet 2
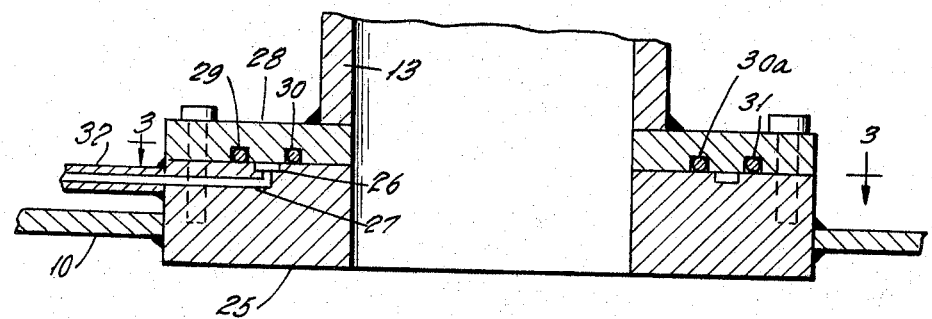
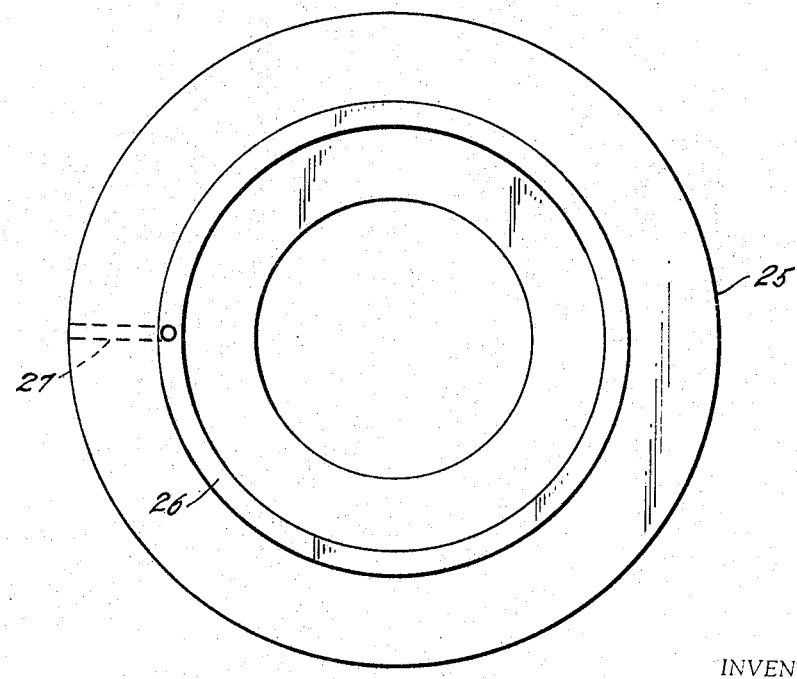
INVENTOR.
D. HARVEY McKEOUGH
BY
OSTROLENK, FABER, GERB & SOFFEN
ATTORNEYS United States Patent Office 3,328,039
Patented June 27, 1967

3,328,039
LEAK-PROOF SEAL
Daniel Harvey McKeough, Ludvika, Sweden, assignor to I-T-E Circuit Breaker Company, Philadelphia, Pa., a corporation of Pennsylvania
Filed Feb. 8, 1965, Ser. No. 431,494
7 Claims. (Cl. 277—3)

ABSTRACT OF THE DISCLOSURE

A high pressure seal between two abutting surfaces formed of two concentric spaced seal rings, one exposed to a high internal pressure to be sealed, the other exposed to the relatively lower external pressure. Gas under high pressure is supplied to the region between the two seals to cause a zero or low pressure differential across the internal seal to prevent leakage through the internal seal. The passage connected to this region contains a valve which responds to the differential pressure across the internal seal to supply additional gas to the region when its pressure decreases due to leakage across the external seal.

This invention relates to a novel seal for high pressure containers, and more particularly relates to a novel leak-proof seal for fluid filled switching devices.

There are many applications which require a virtually leak-proof seal. By way of example, in the high pressure switching field, it is common practice to fill a container with a relatively expensive gas such as sulphur hexafluoride at relatively high pressure. Various elements must enter the container such as bushings and pressure conduits so that a suitable seal arrangement is required at these points to prevent leakage of the high pressure gas, which is necessary for successful switching operation and is relatively expensive to replace.

The principle of the present invention is to provide a novel seal arrangement wherein two concentrically spaced sealing rings are provided at the joint, and which enclose an auxiliary high pressure channel. This auxiliary high pressure channel may then be filled with a suitable gas at the same pressure as the gas within the tank, whereby the differential pressure across the innermost concentric sealing ring is zero, while the pressure across the outermost ring is that pressure differential existing between the interior of the tank and ambient pressure.

In this manner, the innermost seal is virtually a leak-proof seal. The outermost seal which is exposed to the high pressure differential may leak. However, the fluid leaking through this seal will be the fluid applied to the intermediate channel and from some auxiliary pressure source. In the event that a high pressure gas such as sulphur hexafluoride is contained within the main tank, and sulphur hexafluoride is applied to the auxiliary channel from an auxiliary gas source, it is this auxiliary gas which would be lost to the ambient. However, the interior of the tank will still retain its desired pressure so that effective interruption can proceed when required.

Note, however, (1) that the certain applications where the leakage rate is predominantly a function of the differential between the total gas pressure on both sides of the inner seal, as opposed to those applications where the leakage rate is predominantly a function of the partial gas pressures on both sides of the seal, that the auxiliary gas supply could be of a relatively inexpensive gas such as air, so that if the outer seal should leak, it would only leak air rather than the relatively expensive sulphur hexafluoride.

As a further feature of the invention, the intermediate gas passage in the seal may be supplied through an intermittent type of valve arrangement which is responsive to the internal pressure of the main tank. Thus, the passage may be connected to its auxiliary source only during a test interval in which the pressure in the auxiliary system is compared to the pressure in the main container.

Accordingly, a primary object of this invention is to provide a novel leak-proof seal arrangement.

A further object of this invention is to provide a novel seal structure for a high pressure container wherein, if the seal is defective, fluid leakage will occur from an auxiliary fluid container rather than from the main container.

These and other objects of this invention will become apparent from the following description when taken in connection with the drawings, in which:

FIGURE 1 schematically illustrates in partial cross-sectional view an interrupter container having various components entering the container which are adapted with the novel seal of the invention.

FIGURE 2 is a cross-sectional view illustrating the novel seal in detail.

FIGURE 3 is a top plan view of one of the plates of the seal of FIGURE 2.

Figure 1:
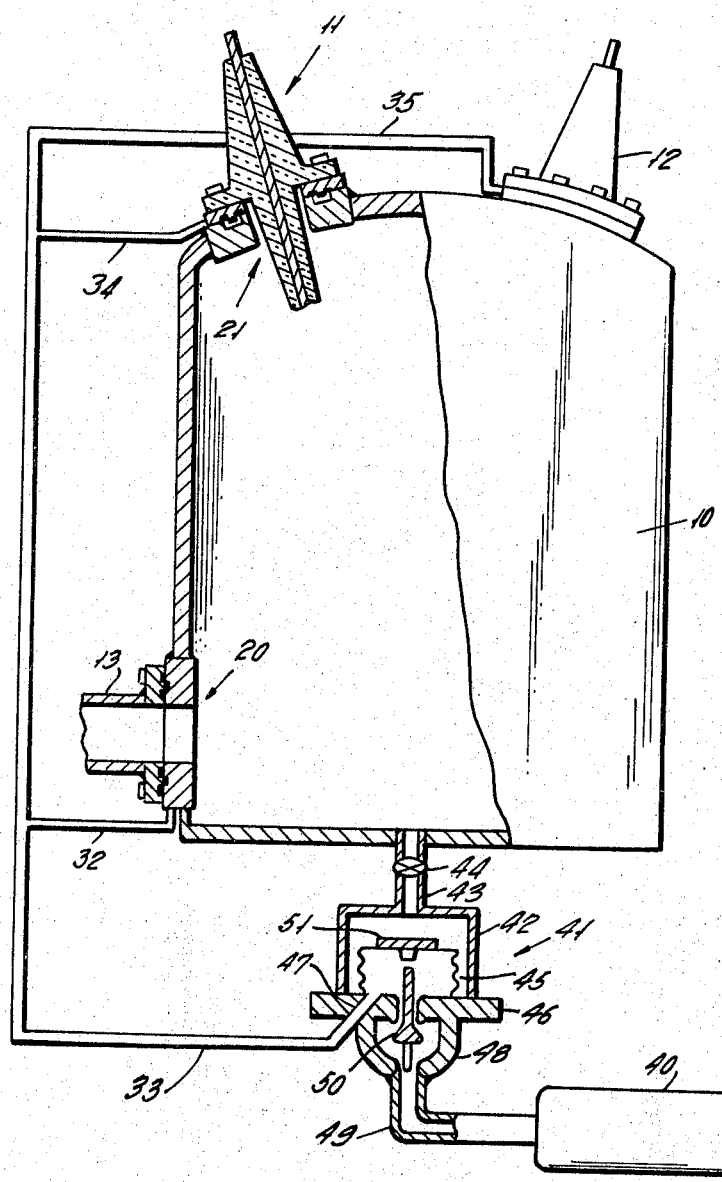

Referring first to FIGURE 1, I have illustrated therein a main container 10 which can be used, for example, for supporting a high voltage circuit breaker in an atmosphere of sulphur hexafluoride under pressure. In such arrangements, the tank 10 will normally have a plurality of bushings such as bushings 11 and 12 which enter the tank and support the interrupter structure (not shown). Similarly, other conduits such as a main pressure supply conduit 13 may enter the tank 10.

Wherever the tank 10 must be entered, it will be apparent that a suitable pressure-tight seal must be provided. In the case of a sulphur hexafluoride-containing interrupter, it is necessary that this seal be as leak free as possible, first because the sulphur hexafluoride is expensive to replace, and secondly, because the gas must be present under pressure to accomplish successful circuit interruption, (2) and to provide suitable dielectric strength between parts of different electrical potential.

The details of the novel seal are best understood by reference to FIGURES 2 and 3 which show the seal arrangement 20 for conduit 13. It will be apparent that the seal arrangement 21 for bushing 11 and a similar arrangement for bushing 12 will be identical to that described for the sealing structure 20.

Referring to FIGURES 2 and 3, I have illustrated therein a first plate member 25 which is welded into the wall of housing 10. Plate member 25 has an annular channel 26 therein (FIGURES 2 and 3) which has a small opening 27 communicating therewith through the side of plate 25.

An upper plate member 28 is then provided which has two annular channels 29 and 30 therein which receive standard resilient sealing gaskets 30a and 31, respectively, in the usual manner. Note that channels 29 and 30 could have been formed in plate 25, if desired. It will be noted that channels 29 and 30, and thus the gaskets 30a and 31, respectively, are concentrically arranged and span channel 26. The conduit 13 is then welded to upper plate 28, as illustrated.

The small passage 27 is then connected to a conduit 32 as by soldering, and is connected to the conduit 33, shown in FIGURE 1.

Similar branch conduits 34 and 35 extend to the sealing arrangement 21 for bushing 11 and the sealing arrangement for bushing 12 which are provided with a structure substantially identical to that described in FIGURE 2.

The conduit 33 may, if desired, be directly connected to an auxiliary source of pressure which insures that the pressure in channel 26 is always approximately equal to, or exactly equal to the pressure within tank 10. When this is the case, the pressure differential across the inner gasket 30a will be zero so that there will be no leakage from the main container and through the sealed area. The pressure across seal 31, however, will be the differential in pressure between ambient and the pressure of channel 26 (which is equal to the pressure within the tank 10).

In the event that there is leakage through seal 31, it will be noted that the leakage gas comes not from the interior of container 10, but from the auxiliary source which may be of some inexpensive gas such as air. Moreover, this leakage will not be from the main container where it may be essential to maintain a predetermined high pressure.

Alternative to the direct connection of an auxiliary source of pressure conduit 33, the conduit 33 can be connected to an auxiliary source 40 through a novel intermittent control structure 41, shown in FIGURE 1. The control structure 41 of FIGURE 1 more specifically includes an auxiliary housing structure 42 which is connected to the interior of container 10 by means of conduit 43 which has a control valve 44 therein.

A bellows 45 is then carried within chamber 42 and seats upon plate support 46. A small opening 47 is then provided in plate 46 which is connected to conduit 33, whereby the pressure applied to conduit 33 is that pressure on the interior of bellows 45.

The plate structure 46 then has a rear dome section 48 which defines a nipple for connection to conduit 49 which is connected to the auxiliary pressure source 40.

A central passage in plate 46 then receives a valve 50 whose upper end is engageable with a lower extension on top plate 51 which encloses bellows 45.

The mechanism 41 operates in the following manner: Under normal conditions, valve 44 is closed, and tank 10 is under its predetermined pressure. The valve 50 is also closed, and it may be assumed that the pressure within bellows 45 has decreased by some amount due to leakage through the outer seal 31. During some predetermined test interval, the valve 44 is momentarily opened, thus filling the interior of chamber 42 with gas to bring it up to the pressure within the interior of chamber 10.

Since the interior of bellows 45 is at a pressure lower than the pressure of tank 10, the bellows will be compressed. Should the pressure within bellows 45 be lower than some predetermined pressure which is deemed the minimum desired in conduit 33, the lower extension of plate 51 will engage valve 50 to momentarily operate valve 50. This will then permit auxiliary source 40 to fill the interior of bellows 45 to a pressure sufficient to lift upper plate 51 to a sufficient height to permit closing of valve 50. Thus, the conduit 33 will be returned to its desired pressure.

Note that suitable pressure measuring instruments can be connected to auxiliary source 40 with suitable alarms that will indicate that the source has fallen below some predetermined allowable pressure. Moreover, this indication of excessive leakage may also be used to actuate appropriate control devices.

It will also be noted that the chamber 42 is mounted adjacent container 10. In this way, the mean temperature of container 10 and, thus, the pressure in both container 10 and container 41 will each change with changes in ambient temperature by the same amount.

When using the device shown in FIGURES 1, 2 and 3, it will now be apparent that a sufficient amount of gas can be stored in auxiliary source 40 so that there is never any hazard that the operating pressure in tank 10 will fall to dangerous levels during service due to leakage. Moreover, the correct gas density will always be maintained within tank 10, even though there are extreme ambient condition changes such as a sudden drop in temperature which would normally cause temporary leakage at resilient seals under a relatively large differential pressure.

Moreover, the novel seal permits assembly of the various components such as entrance bushings 11 and 12 in the conventional manner, and without resorting to a permanently welded joint in order to keep leakage to atmosphere at a reasonable level.

Although this invention has been described with respect to its preferred embodiments, it should be understood that many variations and modifications will now be obvious to those skilled in the art, and it is preferred therefore that the scope of the invention be limited not by the specific disclosure herein, but only by the appended claims.

The embodiments of the invention in which an exclusive privilege or property is claimed are defined as follows:

1. A seal for the connection of a first and second member; said first and second members having opposing surfaces; a first edge portion of said opposing surfaces of said first and second members being at a pressure higher than the pressure at a second edge portion of said opposing surfaces of said first and second surfaces; said seal including a first and second spaced resilient means each extending between said opposing surfaces and being interposed between said first and second edge portions of said opposing surfaces; a gas passage located between said first and second spaced resilient means and coextensive with said first and second resilient means; gas pressure supply means connected to said gas passage to maintain said gas passage at a pressure substantially equal to said higher pressure at said first edge portion; valve means interposed between said gas pressure supply means and said gas passage; and differential pressure responsive means connected between the pressure at said first edge portion of said opposing surfaces and the pressure of said gas passage; said differential pressure responsive means being connected to said valve means and opening said valve means to connect said gas pressure supply means to said gas passage only when the pressure of said gas passage is below a predetermined value with respect to said pressure at said first edge portion.

2. The device substantially as set forth in claim 1 wherein said first and second resilient means and said gas pressure passage are circular.

3. The device substantially as set forth in claim 1 wherein said first and second members are hollow rings having an equal internal and external diameter.

4. The device substantially as set forth in claim 1 wherein said first member has a groove in its said opposing surface for defining said gas passage; said first member having an opening extending therethrough; one end of said opening ending in said groove; the other end of said opening being connected to said gas pressure supply means.

5. The device substantially as set forth in claim 1 wherein said first edge portion is adjacent a source of a first gas at said higher pressure; said gas pressure supply means supplying a second and expendable gas.

6. The device substantially as set forth in claim 1 wherein said differential pressure responsive means includes a bellows having the interior thereof connected to said gas passage and the exterior thereof connected to said pressure at said first edge portion.

7. The device substantially as set forth in claim 6 which further includes a second valve means interposed between said pressure at said first edge portion and said exterior of said bellows.

References Cited

UNITED STATES PATENTS

| | | | |
|---|---|---|---|
| 1,998,852 | 4/1935 | Simmons | 137—505.41 X |
| 2,270,304 | 1/1942 | Jacobsson | 137—505.41 |
| 2,895,750 | 7/1959 | Gardner et al. | 277—3 |
| 3,260,530 | 7/1966 | Jelatis et al. | 277—2 |

FOREIGN PATENTS

| | | |
|---|---|---|
| 1,237,219 | 6/1960 | France. |

SAMUEL ROTHBERG, *Primary Examiner.*